United States Patent [19]
Recker

[11] Patent Number: 5,101,719
[45] Date of Patent: Apr. 7, 1992

[54] HAY BALE VENTILATOR WITH RIBS

[76] Inventor: Florian B. Recker, 802 1st St., S.W., Dyersville, Iowa 52040

[21] Appl. No.: 640,222

[22] Filed: Jan. 11, 1991

[51] Int. Cl.⁵ ............................................. B30B 9/00
[52] U.S. Cl. ...................................... 100/98 A; 56/341; 100/179; 100/295
[58] Field of Search ............... 100/98 A, 179, 188 R, 100/190, 295; 56/341

[56] References Cited

U.S. PATENT DOCUMENTS

| 817,984 | 4/1906 | North et al. | 100/98 A |
| 960,796 | 6/1910 | Bishop | 100/98 A |
| 2,413,522 | 12/1946 | Russell | 100/98 A |
| 2,737,108 | 3/1956 | Galick | 100/98 A |

FOREIGN PATENT DOCUMENTS

| 2450012 | 5/1976 | Fed. Rep. of Germany | 100/98 A |
| 229293 | 11/1985 | German Democratic Rep. | 100/98 A |
| 1076022 | 2/1984 | U.S.S.R. | 100/98 A |
| 753883 | 8/1956 | United Kingdom | 100/98 A |

Primary Examiner—Harvey O. Hornsby
Assistant Examiner—Stephen F. Gerrity
Attorney, Agent, or Firm—Fleit, Jacobson, Cohn, Price, Holman & Stern

[57] ABSTRACT

A hay bale ventilator in the form of an attachment for the plunger of a hay baler to progressively form a central bore or passageway through the hay bale as it is formed by the hay baler thereby reducing the tendency of hay bales to mold in the center thereof due to the moisture content of the material being baled. The hay bale ventilator is in the form of a support plate having a tapered pointed member extending therefrom with the plate being mounted on the plunger of the hay baler and the pointed member forming a hole or passageway through each segment of the hay bale as it is formed. The pointed member is of two-piece construction having a wear-resistant pointed tip removably mounted on a larger cylindrical member connected with the plate. The cylindrical member has four longitudinally extending, radially projecting ribs thereon which forms a hole through the hay bale of generally square configuration.

10 Claims, 1 Drawing Sheet

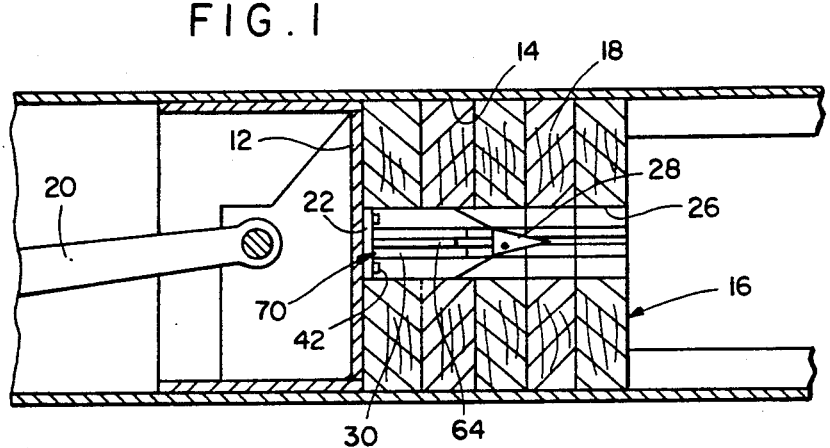
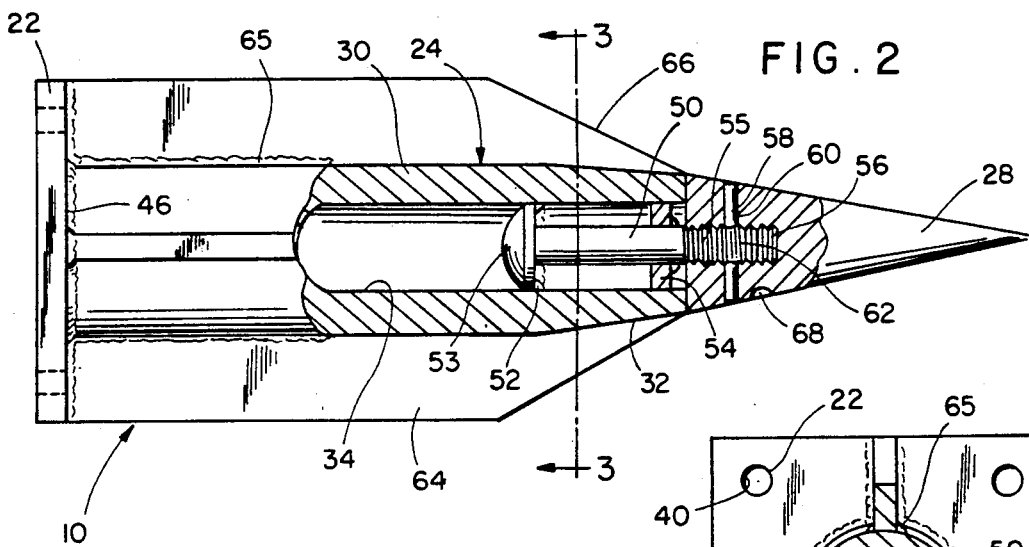
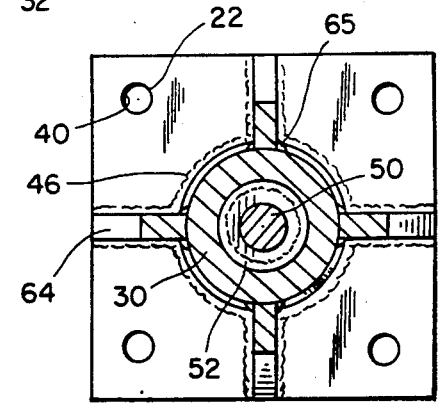
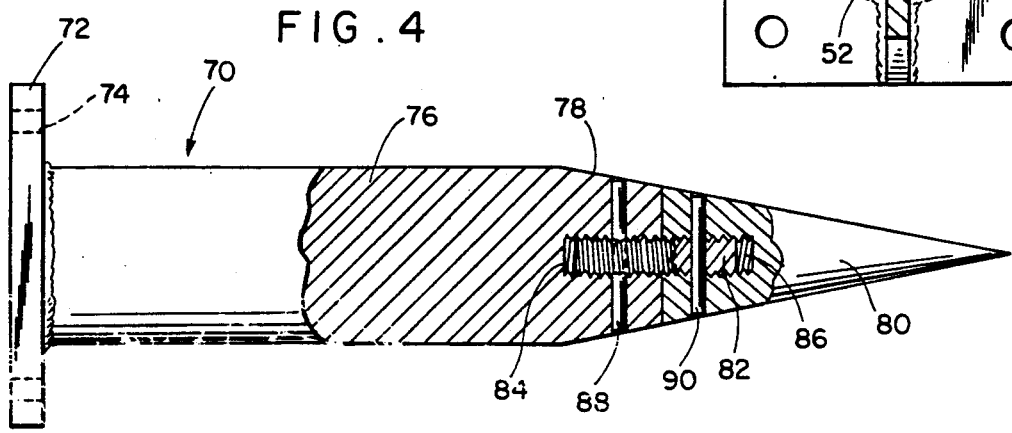

HAY BALE VENTILATOR WITH RIBS

BACKGROUND OF INVENTION

1. Field of Invention

The present invention generally relates to the baling of hay or similar material and more specifically to a hay bale ventilator in the form of an attachment for the plunger of a hay baler to progressively form a central bore or passageway through the hay bale as it is formed by the hay baler thereby reducing the tendency of hay bales to mold in the center thereof due to the moisture content of the material being baled.

The hay bale ventilator is in the form of a support plate having a tapered pointed member extending therefrom with the plate being mounted on the plunger of the hay baler and the pointed member forming a hole or passageway through each segment of the hay bale as it is formed. The pointed member is of two-piece construction having a wear-resistant heat treated pointed tip removably mounted on a larger cylindrical member connected with the plate with the pointed tip and the cylindrical member being tapered to assure that a hole or passageway will be formed without the hay sticking to the pointed member as it reciprocates with the plunger on the baler. The cylindrical member, in one embodiment includes radially extending ribs extending throughout the length of the cylindrical member to form a generally square hole through a hay bale.

2. Description of the Prior Art

Attachments for hay baler plungers to form a bore or passageway in a hay bale are generally known as disclosed in the following U.S. Pat. Nos.:

253,536
960,796
2,420,923
2,654,308
2,804,820
2,933,037
3,022,723

While the above patents disclose the basic concept of forming a ventilating bore or passageway, they do not disclose the specific structure of the hay bale ventilator of this invention including the multiple piece construction, the radial ribs and the manner of assembling the components when mounting the ventilator on the plunger of the hay baler. None of the above patented devices were accepted as a satisfactory method of eliminating mold in a bale of hay. Some of them were manufactured, advertised and offered for sale. However, farmers did not accept them as they didn't perform satisfactorily as they didn't make a hole and in some instances the bales curled into the shape of a banana.

SUMMARY OF THE INVENTION

An object of the present invention is to provide a hay bale ventilator adapted to be attached to the reciprocating plunger of a conventional hay baler to progressively form a longitudinal bore or passageway centrally in a hay bale being formed by the baler thereby providing a continuous bore or passageway of a relatively large cross-sectional area to facilitate air movement through the center of a hay bale to reduce the tendency of mold forming in the center of the hay bale due to the moisture content of the hay used in forming the bale.

Another object of the invention is to provide a hay bale ventilator including a mounting plate and a pointed member extending perpendicular and rearwardly therefrom with a pointed member being of two-piece construction including a removable, tapered, wear-resistant pointed tip or spear and a hollow cylindrical member having a tapered rear end with the taper of the tip being at the same angle as the angle of taper of the rear end of the cylindrical member.

A further object of the invention is to provide a hay bale ventilator in accordance with the proceeding objects in which a bolt with a screw threaded rear end is provided between the cylindrical member and the tip of the pointed member and the front end of the cylindrical member is welded to the base plate and a lock structure is provided between the tip and the bolt to prevent relative rotation therebetween thereby retaining the components of the hay bale ventilator in secure assembled relation on the plunger of the hay baler.

A still further object of the invention is to provide a ventilator in accordance with the preceding objects in which the cylindrical member is provided with four longitudinally extending radial ribs to form a generally square hole in the hay bale.

Still another object of the invention is to provide a hay bale ventilator which is simple in construction, long lasting, trouble free in operation and easy to assemble on the plunger of a hay baler with the device operating efficiently to form a ventilating bore or passageway in a hay bale as it is being formed by the hay baler with an alternative design omitting the ribs for baling certain types of material such as cornstalks, etc.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a schematic elevational view of a hay baler structure with the ventilator of the present invention mounted thereon illustrating the manner in which a central longitudinal bore or passageway is formed in the hay bale.

FIG. 2 is a side elevational view with portions in section illustrating specific structural details of the hay bale ventilator.

FIG. 3 is a transverse, sectional view taken substantially upon a plane passing along section line 3—3 on FIG. 2 illustrating further structural details of the hay bale ventilator.

FIG. 4 is a fragmental sectional view of another embodiment of the invention.

DESCRIPTION OF THE PREFERRED EMBODIMENTS

Referring now specifically to the drawings, the hay bale ventilator of the present invention is generally designated by reference numeral 10 and is mounted on a plunger 12 which reciprocates in a compression chamber 14 of a hay baler as schematically illustrated in FIG. 1. The structure of the hay baler is conventional and forms a hay bale 16 by compressing segments of hay or other material 18 progressively as the hay is fed into the compression chamber in the path of the plunger 12 as the plunger 12 is reciprocated by an actuating mechanism schematically illustrated as a connecting rod 20 which reciprocates the plunger 12 in a conventional manner.

The hay bale ventilator 10 includes a base plate 22 and a pointed member generally designated by numeral 24 which is connected to the base plate 22 and extends generally longitudinally in the compression chamber 14 generally at the center thereof to form a continuous longitudinal bore or passageway 26 in the hay bale 16 as it is formed to enable circulation of air through the center of the hay bale to reduce the tendency of the center of the hay bale to mold due to the moisture content of the hay being formed into the hay bale.

The pointed member 24 extends rearwardly from the plunger and base plate and includes a tapered tip or spear 28 of solid heat treated metal construction and a cylindrical member 30 having a tapered rear end 32 which is engaged by the larger front end of the tapered tip 28 as illustrated in FIG. 2. The interior of the cylindrical member 32 is hollow to form a bore as indicated by reference numeral 34 and the tapered rear end 32 is relatively short with the longitudinal bore 34 extending therethrough.

The base plate 22 is a generally square or rectangular solid metal plate 22 having corner apertures 40 therein receiving fastening devices 42 to secure the plate 22 to the plunger 12. Centrally of the plate 22, the cylindrical member is welded thereto as at 46 to anchor the cylindrical member 30 in the center of the base plate 22.

Welded in the bore 34 in cylindrical member 30 is an elongated carriage bolt 50 as by welding 52 at the head 53 of the bolt and a spacer 54 at the rearward end of the bore. The rear end of the bolt 50 is provided with external screw threads 55 for screw threaded engagement with an internally threaded bore 56 in the large front end of the tip 28 of the pointed member. A roll pin 58 extends transversely through a bore 60 in the tapered surface of the tip 28 and through a passageway 62 in the bolt 50 thereby preventing relative rotation between the bolt 50 and the tip 28 to keep the components of the pointed member 24 assembled and to permit disassembly. Also, the tip 28 is provided with tangential recesses 68 to receive an impact tool such as a punch or the like or a spanner wrench to enable the tip 28 to be screw threaded in relation to the bolt 50. This specific structure is disclosed in my prior U.S. Pat. No. 3,849,007 issued Nov. 19, 1974.

While dimensional characteristics of the device may vary to some extent, preferably, the pointed member 24 includes an overall length of 10" to 12" with the cylindrical member 30 being 6" to 8" in length with the cylindrical portion thereof being 4" to 6" in length and the tapered end 32 being 1" to 2" in length and tapered inwardly at an angle of 10° to 20° in relation to the longitudinal axis of the pointed member. The tip 28 is 4" in length and tapers at a 10° angle in relation to the longitudinal axis of the pointed member. The threaded bore 56 in the tip is 1¼" in depth and the threaded end of the bolt is at least 1" in length. The cylindrical member 30 has an outside diameter of 2" and the plate 22 may be 5" in one dimension and 7" in the other or the plate 22 may be a 4"×4" square plate. After the base plate 22, the cylindrical member 30 and the tip or spear 28 are assembled with the tip securely screwed onto bolt 50, a ⅛" bore 60 in the tip 28 and passageway 62 in bolt 50 are drilled to receive a ⅛" by 1¼" roll pin which securely but releaseably retains the tip screwed onto the bolt.

The construction of the ventilator enables the tip or spear 28 to be constructed of heat treated, high grade steel which will resist wear while the cylindrical member 30 may be constructed of lighter weight and less expensive metal such as aluminum. The bolt is welded in the center of the bore 34 in the cylindrical member 30 and is also constructed of steel. The roll pin provides a secure connection between the components but yet enables the components to be separated for replacement in the event of wear.

The exterior of the cylindrical member 30 is provided with four longitudinally continuous radially projecting ribs 64 welded thereto at 65 and oriented at the center of each edge of the base plate 22 as illustrated in FIG. 3 with the outer edges of the ribs coinciding with the edges of the base plate 22. The rearward end of each rib is tapered at 66 at about 20° and the ribs are welded in place.

This structure will form a generally square bore or passageway 26 through the hay bale. The square configuration of the bore will retain its shape better than a round bore. The ribs will not crush and tear leaves from the stems of alfalfa and other stem and leaf type hay.

FIG. 4 illustrates another embodiment of the hay bale ventilator designated by reference numeral 70 and includes a base plate 72 of square configuration and provided with holes 74 in the corners thereof. A solid cylindrical member 76 is welded centrally to the base plate 72 and includes a tapered rear end portion 78 at an angle of approximately 10° to the surface of the member 76. A wear resistant, heat treated pointed tip 80 forms a continuation of the tapered end portion 78 and is connected to the member 76 by a threaded ready bolt 82 that is threaded into a threaded blind bore 84 in the end of the cylindrical member 76 and a threaded blind bore 86 in the larger end of the tip 80. A roll pin 88 secures the threaded bolt 82 in bore 84 and a roll pin 90 secures the threaded bolt in bore 86 which enables assembly of the pointed tip with the cylindrical member and securely retains them in tight assembled relation during use by drilling holes for the roll pins after the threaded connections have been tightened.

With the ventilator of the present invention attached to the plunger of the hay baler, the hay baler will operate in a normal manner with the ventilator forming a bore or passageway through each increment or segment of the hay bale as it is being compressed thereby forming a continuous bore or passageway through the completed hay bale in order to enable air to pass therethrough after the hay bale has been discharged from the hay baler and while it rests on the ground and after it has been collected and stored with the ends thereof exposed.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A hay bale ventilator adapted to be attached to a reciprocating plunger of a hay baler to form a hole through the center of a hay bale, said ventilator comprising a pointed member and means mounting the pointed member on a plunger of a hay baler, said pointed member comprising a tapered tip having a larger end and a smaller end and being constructed of wear resistant material and a cylindrical member having a tapered end engaged by the larger end of the tapered tip, and means mounting the tapered tip on the cylindrical member comprising a threaded bolt means threaded axially into the larger end of the tapered tip and connected with the cylindrical member for retaining the tip on the cylindrical member.

2. The hay bale ventilator as defined in claim 1 wherein said cylindrical member is constructed of tubular steel.

3. The hay bale ventilator as defined in claim 1 wherein said means mounting the pointed member on a plunger of a hay baler includes a base plate having apertures for receiving fasteners to secure the base plate to the plunger, said base plate being rigidly connected with the end of the cylindrical member remote from the tip to retain the cylindrical member, base plate and plunger in rigid relation.

4. The hay bale ventilator as defined in claim 1 wherein said threaded bolt means includes a bolt rigidly affixed to the cylindrical member and including a threaded end, the larger end of the tip having an internally threaded bore in threaded engagement with the threaded end of the bolt thereby retaining the tip and cylindrical member in assembled relation.

5. The structure as defined in claim 4 wherein said tip and bolt include a removeable roll pin extending transversely therethrough to prevent relative rotation between the tip and bolt.

6. The hay bale ventilator as defined in claim 4 wherein said cylindrical member is solid and includes a threaded bore in its tapered end, said bolt means including a threaded ready bolt threaded into said bore and a roll pin extending through the tapered end of the cylindrical member and the ready bolt received in the threaded bore to securely anchor the bolt to the cylindrical member.

7. The hay bale ventilator as defined in claim 6 wherein said tapered end of the cylindrical member has the same angle of taper as said tapered tip.

8. A hay bale ventilator adapted to be attached to a reciprocating plunger of a hay baler to form a hole through the center of a hay bale, said ventilator comprising a pointed member and means mounting the pointed member on a plunger of a hay baler, said pointed member comprising a tapered tip having a larger end and a smaller end and being constructed of wear resistant material and a cylindrical member having a tapered end engaged by the larger end of the tapered tip, and means mounting the tapered tip on the cylindrical member comprising a threaded bolt means threaded axially into the larger end of the tapered tip and connected with the cylindrical member for retaining the tip on the cylindrical member, said cylindrical member including four equally spaced, longitudinally extending radially projecting ribs thereon to form a hole through the hay bale of generally square configuration.

9. The hay bale ventilator as defined in claim 8 wherein said cylindrical member is hollow and said bolt means includes a bolt welded into the hollow cylindrical member inwardly from the tapered end.

10. The hay bale ventilator as defined in claim 8 wherein each of said ribs has a tapered end at the tapered end of the cylindrical member, said ribs being tapered at an angle greater than the angle of taper of the tapered tip.

* * * * *